United States Patent
Bratkovski (10) Patent No.: US 7,397,370 B2
(45) Date of Patent: Jul. 8, 2008

(54) MONITORING AN ENVIRONMENT USING A RFID ASSEMBLY

(75) Inventor: Alexandre Bratkovski, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 151 days.

(21) Appl. No.: 11/069,389

(22) Filed: Mar. 1, 2005

(65) Prior Publication Data

US 2006/0208879 A1 Sep. 21, 2006

(51) Int. Cl.
*G08B 1/08* (2006.01)
*G08B 13/14* (2006.01)

(52) U.S. Cl. .............................. 340/539.26; 340/572.1; 340/333; 340/539.3

(58) Field of Classification Search ............ 340/539.26, 340/572.1, 10.34, 539.3
See application file for complete search history.

(56) References Cited

U.S. PATENT DOCUMENTS

| | | | |
|---|---|---|---|
| 5,300,875 A | | 4/1994 | Tuttle |
| 6,476,708 B1 * | | 11/2002 | Johnson ................... 340/10.34 |
| 6,720,866 B1 * | | 4/2004 | Sorrells et al. ............. 340/10.4 |
| 6,944,424 B2 * | | 9/2005 | Heinrich et al. ............ 455/41.1 |
| 2003/0231106 A1 * | | 12/2003 | Shafer ..................... 340/10.34 |
| 2005/0017602 A1 * | | 1/2005 | Arms et al. ................. 310/339 |

FOREIGN PATENT DOCUMENTS

DE 10253367 6/2004
WO WO03056354 7/2003

OTHER PUBLICATIONS

Colla, T.P. et al., "A Capacitance Humidity-Sensing Transducer", Components, Hybrids, and Manufacturing Technology IEEE Transactions, Sep. 1979, vol. 2, Issue 3.
Roberti, M., "Navy Revs Up RFID Sensors", RFID Journal, Jun. 2004.
Wang, H. et al, "A Multi-Channel Temperature and Humidity Monitor", Department of Automation and Materials, Tianjin Univ., People's Republic of China, Oct. 1992.
http://www.epcglobalinc.org/standards_technology/specifications. html, downloaded Feb. 16, 2005.
http://www.rfidgazette.org/2004/10/axcess_rfid_sen.html, downloaded Feb. 16, 2005.

* cited by examiner

Primary Examiner—Donnie L. Crosland (57) ABSTRACT

An assembly for monitoring an environment includes a RFID tag and at least one sensor assembly. The sensor assembly is configured to sense information regarding the environment around the assembly and convert a sensed event into power to at least partially power operation of the RFID tag.

23 Claims, 6 Drawing Sheets

MONITORING AN ENVIRONMENT USING A RFID ASSEMBLY

BACKGROUND

When a breach or other detrimental change occurs, the detrimental change may need to be corrected immediately. In many cases, correction is required because further damage may arise if the detrimental change is not rectified.

As a simple example, if an automobile drives over a nail, one of the automobile's tires may become punctured. If the tire is not repaired or replaced, the driver may experience problems in steering and/or braking. In addition, if the automobile is driven at normal speeds, the wheel may become damaged. Determining that there is a problem with the tire may not be difficult for an experienced driver because the experienced driver may notice a problem based on a change in the feel of the automobile. The driver may also determine that the tire is damaged through a visual inspection. In other instances, the driver may be notified of the damage by other people who have seen the damage. Another example may include either instant damage or developing damage to a flying craft.

It is not always possible, however, to detect or visually inspect an environment in which damage has occurred. For example, the environment may be in a remote location that is not easily visualized, such as, in the skin of a flying craft or space vehicle. In this example, the occupants of the vehicle may be unaware of the damage because they would likely be unable to detect or visually inspect the damage.

It would therefore be desirable to detect changes in various environments that are not easily detected or seen.

SUMMARY

An assembly for monitoring an environment is disclosed herein. The assembly includes a RFID tag and at least one sensor configured to sense information regarding the environment around the assembly. The sensor is also configured to convert a sensed event into power to at least partially power the operation of RFID tag.

A method of monitoring an environment is also disclosed. In the method, information regarding an event in an environment is sensed using at least one radio frequency identification ("RFID") assembly, wherein the at least one RFID assembly is powered at least in part by power generated by the event. In addition, information regarding a change in the environment is determined based on the sensed information.

A system for monitoring an environment includes means for sensing information regarding an event in an environment. The means for sensing information regarding the environment is powered at least in part by power generated by the event. The system also includes means for determining information regarding change in the environment based on the sensed information.

A computer program on a computer readable medium and comprising code, that when executed, causes a computer to receive information sensed by a RFID assembly that sensed a condition of an environment, where the RFID assembly is powered at least in part by power generated by the condition, and to determine information regarding change in the environment based on the sensed information.

BRIEF DESCRIPTION OF THE DRAWINGS

Features of the present embodiments will become apparent to those skilled in the art from the following description with reference to the figures, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

A method and system for monitoring an environment is described. A plurality of radio frequency identification ("RFID") assemblies is dispersed in an environment to monitor and sense changes, such as, for instance, breaches or damage, to the environment in which the RFID assemblies are dispersed. The RFID assemblies may include a RFID tag including a unique identification ("ID") code to identify the tag. The RFID assemblies may each also include at least one sensor to sense information, such as, changes regarding the environment, and an antenna to transmit sensed information to a processing system. The processing system may receive the sensed information along with other information regarding the RFID assemblies, such as, the unique ID, and use the information to determine information regarding a change in the environment. For example, the information may be used to determine the location of the change, type of the change, depth of the change, time when the change occurred, if the change is evolving in some way (such as, if a crack continues to grow), the velocity with which the change is evolving, etc.

Through implementation of the method and system for monitoring an environment disclosed herein, changes in various environments may be monitored, even in situations where the changes are not readily detectable.

Figure 1:
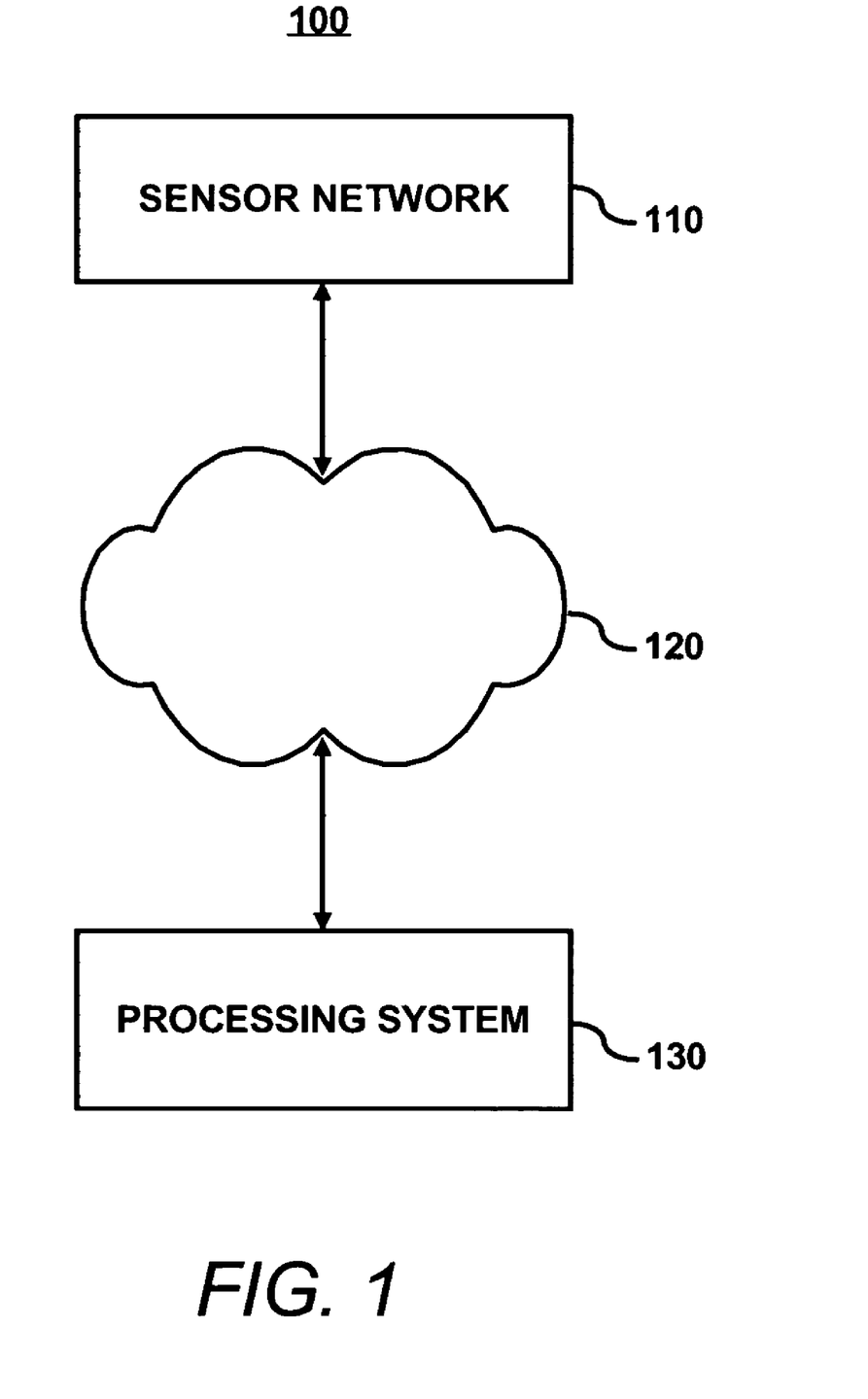
FIG. 1 illustrates an environment monitoring system.

FIG. 1 illustrates an environment monitoring system 100. As shown in FIG. 1, the environment monitoring system 100 includes a sensor network 110 and a processing system 130. The sensor network 110 is configured to sense changes to an environment in which it is placed. The changes may include changes in physical attributes, chemical attributes, and/or optical attributes, and the like. In operation, the sensor network 110 is configured to transmit the sensed changes as electrical signals to the processing system 130. The sensed changes may be transmitted over a communications link 120 from the sensor network 110 to the processing system 130. The communications link 120 may include a wireless, wired, or combination of wired and wireless links.

It should be readily apparent that the environment monitoring system 100 depicted in FIG. 1 represents a generalized illustration and that other elements may be added or existing elements may be removed or modified without departing from a scope of the environment monitoring system 100. For example, the environment monitoring system 100 may include any reasonably suitable number of sensor networks 110 and processing systems 130 and should thus not be construed as being limited to the sensor network 110 and processing system 130 depicted in FIG. 1.

Figure 2A:
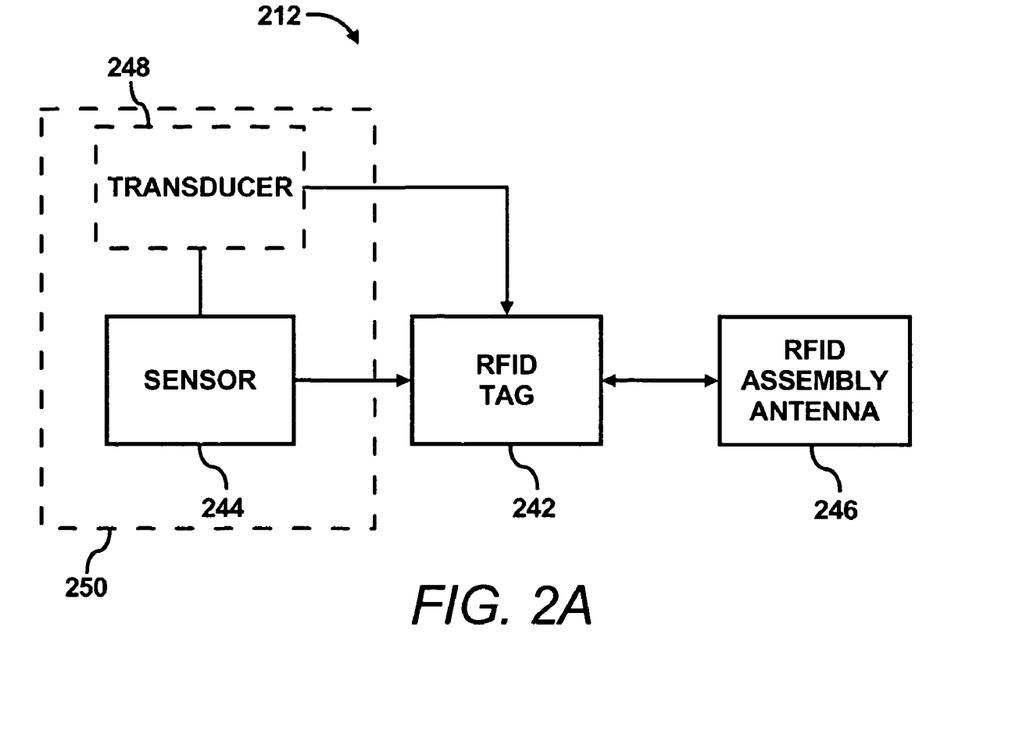
FIG. 2A illustrates an example of a RFID assembly that may be used in the sensor network illustrated in FIG. 1.

FIG. 2A is a block diagram illustrating an example of a RFID assembly 212 that may be used in the sensor network 110 depicted in FIG. 1. The sensor network 110 may include a plurality of RFID assemblies 212. Each of the RFID assemblies 212 are illustrated in FIG. 2A as including a sensor 244, a RFID tag 242, and an antenna 246.

The sensor 244 may include any type of sensor appropriate to the environment(s) in which it is to be placed. In some instances, the same RFID assembly 212 may be designed to be appropriate for many different environments. In other instances, the RFID assembly 212 may be designed to be directed to more specific types of environments. The various environments in which the RFID assembly 212 may be placed include outdoor areas, such as fields, nuclear reactors, automobiles, vehicles, including space vehicles, parts of vehicles, such as tires or engines, mechanical or electrical equipment, wearable garments, animal skins, etc. The RFID assembly 212 may be placed in any area of the environment including various surfaces within or on the environment, such as, the outer skins of vehicles, for example. Thus, the environment may include a surface or a multi-dimensional space, such as a multi-layered surface or field or interior of a container or building.

The sensors 244 may sense changes to physical attributes (including mechanical, optical attributes, etc) chemical attributes, biological attributes and the like. In addition, although a single sensor 244 has been illustrated in FIG. 2A, any reasonably suitable number of sensors may be included in the RFID assembly 212 without departing from a scope of the RFID assembly 212. In this regard, a single RFID assembly 212 may be capable of sensing changes in more than one type of attribute.

The antenna 246 may be used to assist in the transmission of the changes to the various types of attributes to a processing system, such as the processing system 130 shown in FIG. 1. The antenna 246 may include any reasonably suitable type of antenna and in certain instances, the antenna 246 may include the antenna that is part of the RFID tag 242 or the antenna 246 may include a separate antenna.

In general, RFID tags use radio frequency technology to transmit information stored in the RFID tags to RFID readers. In this regard, the RFID tag 242 may include an integrated circuit and an antenna. In addition, the RFID tag 242 may include a passive RFID tag (which does not require an internal power source, such as, a battery) or an active RFID tag (which does require an internal power source). In one embodiment, the RFID tags 242 used in the sensor network 110, shown in FIG. 1, include passive RFID tags.

Typically, the RFID readers (not shown) include inductive elements for generating magnetic fields that energize RFID tags 242. For instance, the inductive elements may be parts of antennas contained in the RFID readers. In operation, the magnetic field generated by the inductive element induces an energizing signal for powering the RFID tag 242 via the antenna. As such, the RFID tag 242 may include an inductive element and RFID tag electronics, such as, an integrated circuit. In this regard, when the RFID tag 242 is in proximity of the RFID reader, the magnetic field generated by the RFID reader energizes the RFID tag 242 by inducing a voltage across the RFID tag's inductive element and provides power to the tag electronics. Information in the RFID tag 242 is transmitted to the RFID reader using the tag electronics and the RFID tag's 242 inductive element by alternating the loading of the tag's inductive element in a pattern corresponding to the data being sent to the reader. This technique is known as load modulation. Other types of passive tag technology as well as active tag technology may be employed by the RFID assembly 212 without departing from a scope of the RFID assembly 212.

In one embodiment, the sensor 244 may be configured to be a part of a sensor assembly 250. The sensor assembly 250 may be configured to power the RFID tag 242. The sensor assembly 250 may include only the sensor 244 or the sensor 244 and a transducer 248. The RFID tag 242 may be powered by the sensor assembly 250 when a change occurs in the environment, as described in greater detail herein below. Thus, the sensor assembly 250 may be configured to transform power released during an event into power to power the RFID tag 242. In one embodiment, the sensor(s) 244 may include a piezoelectric element (for example, a strain sensor). In one embodiment, the power may be generated by impact itself, by deforming the piezoelectric element (i.e., the sensor 244). A voltage bias may be produced by the deformation of the piezoelectric element which may be passed to the RFID tag 242 to generate a signal. This may be a one-time occurrence.

The transducer 248 may be configured to harvest energy released by the event. If the sensor 244 includes a sensor that is not capable of transforming energy from an event into power, the transducer 248 may be used to transform the energy released by the event into power for the RFID tag. For example, some types of chemical or optical sensors may be implemented as part of a sensor assembly 250 with a transducer 248.

In one embodiment, the RFID tag 242 may also be powered by an external radio-source that will irradiate the RFID tag with a particular wavelength that is absorbed by the RFID antenna 246. In another embodiment, constant power may be supplied by a battery. For example, the RFID tag may be powered by a thin film battery that can last for years.

If an event occurs to activate the sensors 244, the RFID tags 242 are activated. An event may include any type of change or other occurrence in the environment. For example, an event may include an impact of a rock hitting a vehicle skin. The RFID tags 242 transmit identification, such as unique identification associated with each RFID tag 242, to the processing system 130. For example, RFID tags 242 are typically programmed with unique identification codes. In one embodiment, the RFID tags 242 may include information that allows the RFID tags 242 to be mapped in the environment in which they are placed. For example, the RFID tags 242 may be provided with location information when they are initially placed in the environment. In another embodiment, the unique identification code stored in the RFID tag 242 of a particular RFID assembly 212 may used by the processing system 130 to compute and store location information for the particular RFID assembly 212.

In one embodiment, the RFID tag 242 may be powered by stress generated by changes sensed by the sensor 244. For example, certain chemicals are detected by swelling of a particular polymer absorbing one of these types of chemicals from the environment. The swelling of the polymer would lead to a stress applied to an actuator that may be used to generate voltage and activate the RFID tag. For example, a box with an open top may be filled with a polymer known to absorb known chemical species (e.g. water $H_2O$, etc.) from the environment and swell as a result of such absorption. A lid may be put on this box with a window made from a piezoelectric film. Pressure may be applied to the piezoelectric window by the swelling polymer to deform the piezoelectric window. Pressure may be applied to the piezoelectric window to produce a voltage bias that may be applied to an external detecting circuit. The swelling polymers may include any polymers that swell upon absorption of a chemical. Such polymers are well known in the art.

Other types of sensors may include sensors which change their electrical resistivity with humidity, for example, semiconductor ceramic $Ni_{1-x}Mn_xWO_4$ with x=0.2 and 2.5% weight addition of $LiCO_3$, $Nb_2O_5$, and $V_2O_5$ exhibits almost linear change with humidity changing in the range 10-100%, with overall sensitivity $10^4$ (in other words, dR/R=10,000, where R is the resistivity of the material and dR=R(dry)–R (humid)).

The signals reflecting the change to the environment may be amplified by the tag electronics before being transmitted to the processing system 130. In addition or alternatively, constant monitoring may be performed using low power sources, such as, ultra-low power durable thin film batteries or other power sources suitable for use with the RFID assembly 212 described.

Figure 2B:
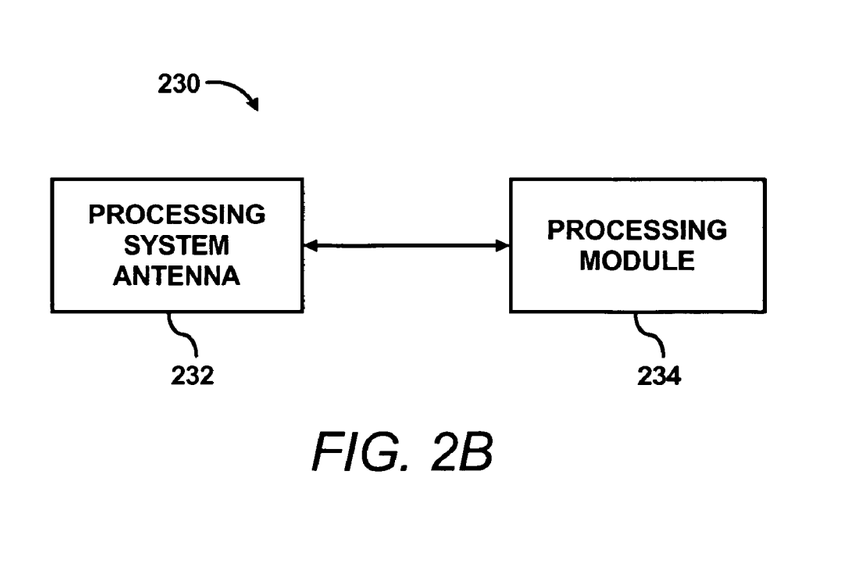
FIG. 2B illustrates an example of a processing system that may be used for the processing system illustrated in FIG. 1.

FIG. 2B illustrates an example of a processing system that may be used for the processing system 130 illustrated in FIG. 1. The processing system 230 is depicted as including an antenna 232 and a processing module 234. The antenna 232 may include any type of antenna that may be configured to receive signals from a sensor network, such as, the sensor network 110 shown in FIG. 1.

The processing module 234 may include any type of processing arrangement that may be configured to process information received from the sensor network 110 by the antenna 232. For example, the processing module 234 may include a computer system, such as the computer system 600 described below with respect to FIG. 6.

The processing module 234 receives information from RFID assemblies 212 which sense a change in the environment. This information may be received through the antenna 232. In one example, the processing module 234 uses the received information to re-create the change in the environment which triggered the transmission of the information by the RFID assembly 212. The processing module 234 may use locally stored RFID locations (for example, the location of the RFID assembly 212 may be stored locally in association with the unique code of the RFID tag 242 in the RFID assembly 212), the communicated unique codes, registered delays and/or signal amplitudes to recreate the change in the environment. The changes may be recreated using any reasonably suitable type of software, hardware, firmware, or combination of any of the preceding that is used to detect changes in an environment.

For example, the processing module 234 may include an algorithm that uses the linear inverse problem in mathematics: given the positions of the nodes (sensors) and delays in reporting the signal, find out what could cause the signal and imply a particular scenario, i.e. a micrometeorite or projectile hit. The software is very diverse and should be used according to the task at hand.

Figure 3:
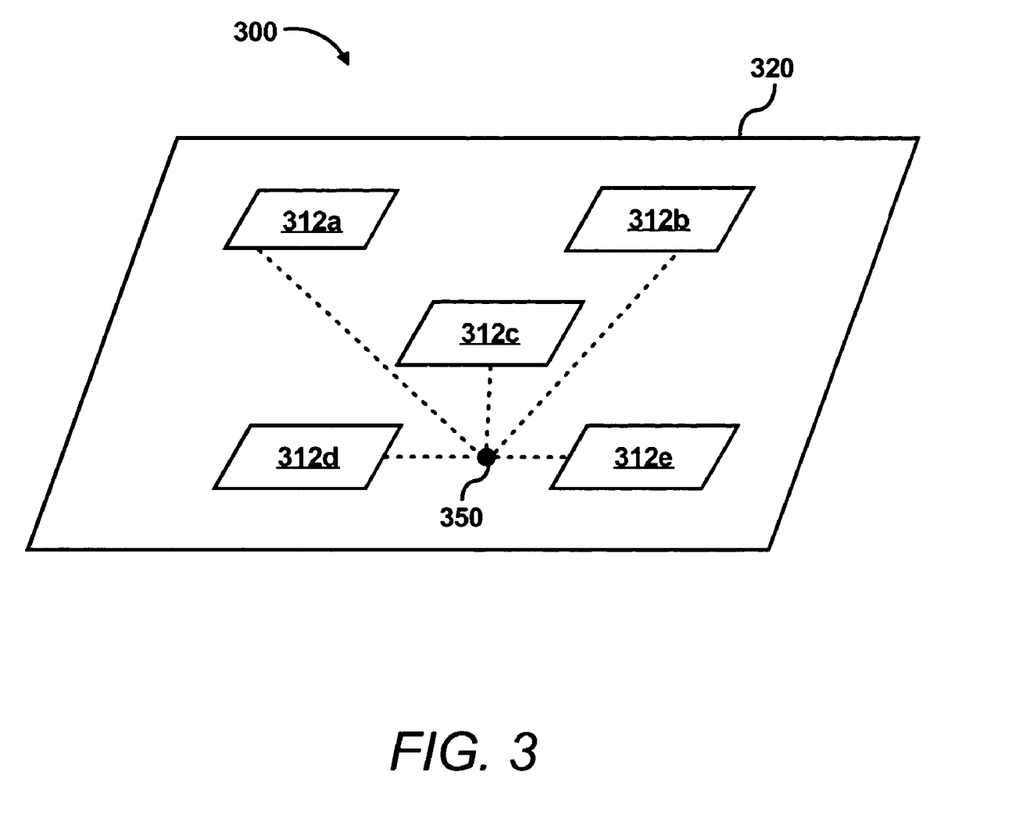
FIG. 3 illustrates an example of an environment including a sensor network.

FIG. 3 illustrates an example of an environment 300 including a sensor network. A surface 320 in the environment includes an array of RFID assemblies 312a-312e. The RFID assemblies 312a-312e may include unique ID codes which are communicated to a processing system, such as the processing system 130 shown in FIG. 1. The processing system 130 may determine and/or store the location of each of the RFID assemblies 312a-312e. When an event, such as event 350, occurs to cause a change in the surface 320, some or all of the RFID assemblies 312a-312e may detect some type of change.

The RFID assemblies 312a-312e that are closest to the event 350, such as RFID assemblies 312c-312e, may detect the change earlier than the RFID assemblies that are farther away, such as RFID assemblies 312a-312b. Correspondingly, each of the piezoelectric actuators of the RFID assemblies 312a-312e closer to the event would provide relatively more power to its respective RFID tag than the piezoelectric actuators of the RFID assemblies 312a-312e that are further away from the event. For example, if the assembly is a distance R away from the epicenter of a hit that produces a deformation, the energy of the local deformation would be proportional to $R^{-2}$ (i.e. the local energy decreases away from the epicenter). Since a fraction of the local energy of deformation may be transduced to power a RFID tag, the RFID tags closer to the epicenter will get more power.

The strength of the signal transmitted to the processing system 130 is in proportion to the respective proximities of the RFID assemblies 312a-312e to the changes sensed by the RFID assemblies 312a-312e. Thus, the processing system may use the location of each of the RFID assemblies 312a-32e which transmitted a signal, as well as the signal strength and delays to determine where the change occurred. For example, a set of all measured delays registered by all sensors involved and communicated to the processing unit may be used, along with location information, to determine location and other information regarding the change.

The strength of the signal and information in the signal may be used to determine what type of change occurred. This information may be used to re-create the event 350 that caused the change and/or when the event and/or change occurred. The information may also be used to monitor changes. For example, if the change is a crack, the growth of the crack and the speed of growth of the crack may be in principle determined from the information.

Figure 4:
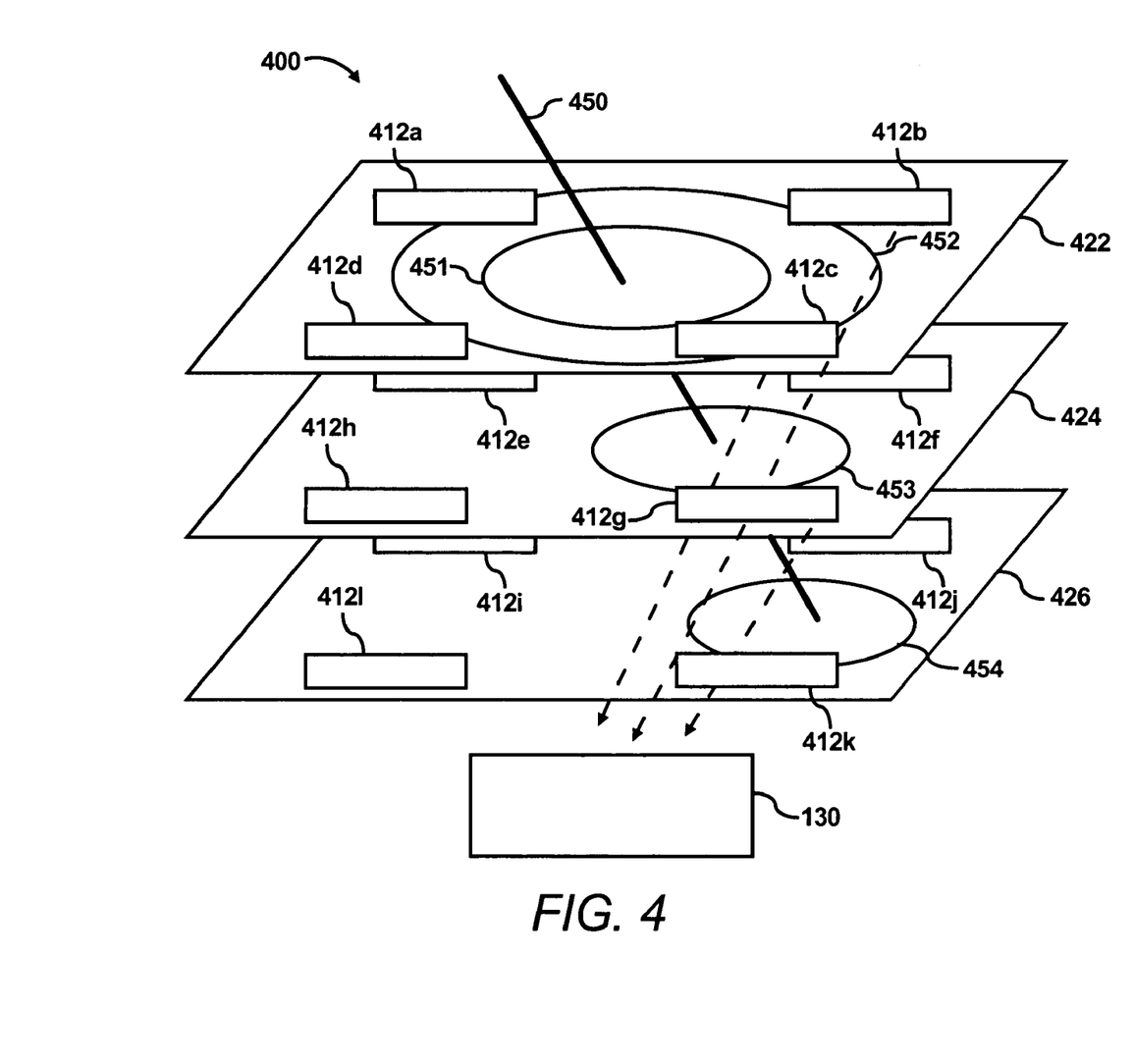
FIG. 4 illustrates an example of a multi-layered environment including a sensor network.

FIG. 4 illustrates an example of a multi-layered environment 400 including a sensor network. The environment shown in FIG. 4 includes a plurality of surfaces 422, 424, 426. This type of environment may include, for example, a multi-layered skin of a vehicle, such as, a space vehicle or an automobile.

Each surface 422, 424, 426 includes an array of RFID assemblies 412a-412l. When an event, such as event 450, occurs, it may cause some type of a change 451-454 in the environment. The event 450 shown may include any type of event that penetrates the top surface 422, and causes changes to two surfaces 424, 426 below the top surface. The event 450 may include, for example, a meteorite hitting a space vehicle, a rock hitting a car, a bullet hitting a tank, etc.

As shown in FIG. 4, the event 450 caused a deformation and a sound wave-type effect in the top surface 422. The innermost portion 451 of the change is likely to be a stronger change than the outermost portion 452 of the change in the top surface 422. As shown in FIG. 4, a particular RFID assembly 412c is in an area that detects both portions 451, 452 of the change. Thus, the particular RFID assembly 412c may transmit a signal to the processing system 130 that is stronger than the signals transmitted by the other RFID assemblies 412a-412d on the top surface. The particular RFID assembly 412c may also transmit a signal that is stronger than the signals transmitted by any of the RFID assemblies 412e-412l on the lower two surfaces 424, 426 if the strength of the change in the innermost portion 451 of the top surface are stronger than the strength of the change in the portions 453, 454 of the change in the two lower surfaces 424, 426.

Since the other three RFID assemblies 412*a*, 412*b*, 412*d* detect the outermost portion 452 of the change in the top surface 422, the other three RFID assemblies 412*a*, 412*b*, 412*d* may also transmit signals to the processing system 130. In the middle surface, since only one RFID assembly 412*g* appears to be in the area in which a portion 453 of the change occurred, the one RFID assembly 412*g* may transmit a signal to the processing system 130 to indicate that a change has occurred in the area which that RFID assembly 412*g* is monitoring. In the lowest surface 426, only one RFID assembly 412*k* is monitoring an area where a portion of the change occurred. Thus, the one RFID assembly 412*k* may also transmit a signal to the processing system 130 to indicate that a change has occurred in the area which that RFID assembly 412*k* is monitoring.

The processing system 130 receives information from the RFID assemblies 412*a*-412*e*, 412*g*, 412*k* that are monitoring areas in which the change 451-454 occurred. The processing system 130 may use the locations of the RFID assemblies 412*a*-412*e*, 412*g*, 412*k* transmitting signals, the strengths of the signals from each of the RFID assemblies 412*a*-412*e*, 412*g*, 412*k* transmitting signals, and delays between the signals (for example the time delays may be counted from the first report to reach the processing system) to determine where the change 451-454 occurred and the depth of the change 451-454. The strengths of the signals received and information in the signals may be used to determine what type of change 451-454 occurred. This information may be used to re-create the event 450 that caused the change 451-454 and/or when the event and/or change occurred. The information may also be used to monitor developments with regard to the change, such as a crack growth versus an instantaneous hit. For example, if the change is a hole, the growth of the hole and the speed of growth of the hole may be determined from the information.

Figure 5:
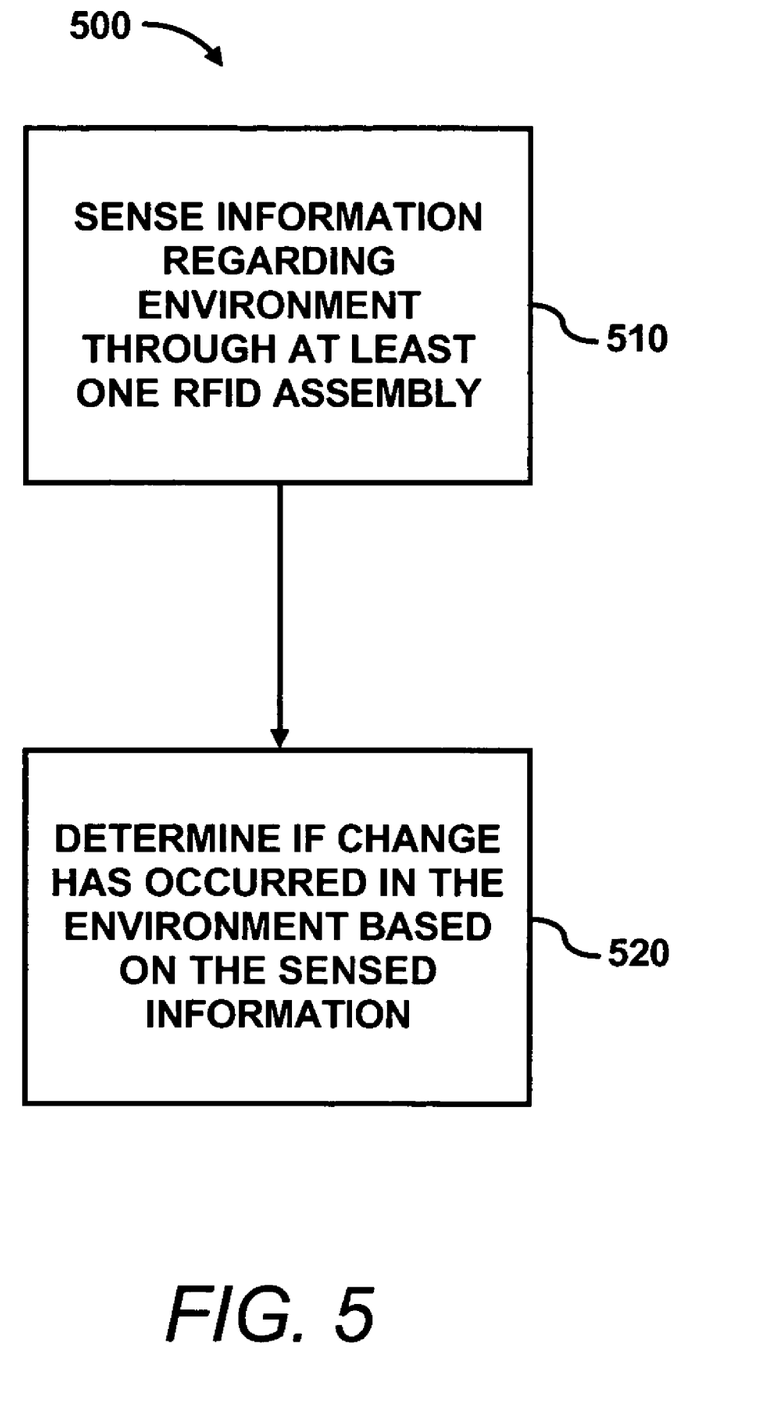
FIG. 5 illustrates an example of a method of monitoring an environment.

FIG. 5 illustrates an example of a method 500 of monitoring an environment. Although reference may be made to FIGS. 1, 2A-2B, 3 and 4, it will be understood that the elements shown in these figures are not necessary for the performance of the method described. As such, references to FIGS. 1, 2A-2B, 3 and 4 are for illustrative purposes and are not meant to limit the method 500 to features illustrated in those figures.

At step 510, information regarding an environment is sensed through at least one of a plurality of RFID assemblies, such as RFID assembly 212 shown in FIG. 2A. The environment may include any type of environment which it is desired to monitor. For instance, the environment may include a surface, such as, a vehicle skin, or a multi-dimensional space, such as, a field or the interior of a building or container, wearable vest, etc. In addition, the RFID assemblies may be positioned in any reasonably suitable manner. For instance, the RFID assemblies may be manually positioned at specific areas, the RFID assemblies may be sprayed into the environment in which they are designed to monitor, etc.

The sensed information may include physical information (mechanical, optical etc), chemical information, and the like. The physical information may include a vibration or other change in the physical attributes of the environment, such as, some type of a breach in the environment. The chemical information may include a swelling of a polymer, as described above with respect of FIG. 1. The sensed chemical information may be used to detect leaks, for example, the sensed information may be used to detect if a leak occurred in a fuel tank. The optical information may include a change in the way light reflects of various surfaces or an increase or decrease in light. If the sensor network includes a light/infrared ("IR") sensor network, the sensed information may be used to detect position of a craft with respect to its surroundings. For example, the sensed information may be used to detect position of a vehicle with regard to the Sun or other light source.

Each of the RFID assemblies may be powered by the sensed event. In one embodiment, at least one sensor of each RFID assembly may be configured to convert (or transducer) the sensed event to power for the RFID assembly. In one embodiment, at least one sensor of each RFID assembly may be configured to transform power released during the event into power to power the RFID tag. Thus, for example, if the sensed event includes an impact, a sensor may transform power released during the impact to power for its associated RFID assembly. In one embodiment, the sensed event may be converted (or transduced) to a one-time pulse needed to transmit the sensed information.

Sensed information may typically include a change in the environment, such as, change 451-454 shown in FIG. 4. Continuing with the example shown in FIG. 4, the change in the environment may provide stress to a sensor of the RFID assembly 212 as described in greater detail herein above. The sensor may then power a RFID tag 242 which may transmit the sensed information to a processing system, such as the processing system 130 shown in FIGS. 1 and 4. The sensed information may be transmitted by an RFID assembly antenna 246.

The sensed information may be pre-processed by a specially designed RFID assembly 212. More particularly, the sensed information may be pre-processed in the tag electronics of the RFID tag 242. For example, some minimal computing ability may be built into the tag and a battery. The pre-processing may include, for instance, amplification of the signal for the sensed information prior to transmission. Pre-processing may further include writing information into local memory, such as an embedded microprocessor. The RFID assembly 212 may also transmit other information, such as, a unique ID code identifying the RFID tag 242, and thus, the RFID assembly 212. In certain instances, the RFID assemblies 212 may initialize themselves by transmitting the unique IDs to the processing system 130 so that the processing system 130 may determine where the RFID assemblies 212 are located in the environment. Energy for writing information into or reading information from the RFID assembly 212 may require additional battery.

In addition to or in place of the sensor receiving information and transforming power from the sensed event, the RFID assemblies may continuously sense information regarding the environment from the plurality of RFID assemblies to monitor the environment and periodically transmit this information. In this embodiment, the RFID assemblies may also be powered by another low power source, such as a RFID reader or a battery. For example, the RFID assemblies may be powered by an ultra-low power thin film battery.

At step 520, information regarding a change in the environment is determined based on the sensed information. The determination regarding the change in the environment may be performed at a processing system, such as, the processing system 130 shown in FIG. 1 and FIG. 4 or the processing system 230 shown in FIG. 2B.

The processing system antenna 232 of the processing system 230 may be used to receive the sensed information. The processing module 234 of the processing system 230 may use the received information to determine information regarding the change in the environment. For example, the processing module 234 may use an inverse algorithm, such as triangulation, on the locations of the RFID assemblies 212 which transmitted signals to determine information regarding the change in the environment. The information that the processing system 230 determines regarding the change may include the location of the change, the type of the change, the depth of the change, the time the change occurred, evolution of the change (for example, if a crack continues to grow), the rate at which the change is evolving (for example, the rate at which the crack is growing), etc.

The processing system 130, 230 may determine information regarding the change based at least partially on the location of each of the RFID assemblies 212 which transmitted a signal. The processing system 130, 230 may store location information regarding each RFID assembly locally. For example, the processing system 130, 230 may store location information regarding each RFID assembly in association with the unique ID associated with the RFID tag of the RFID assembly. In one embodiment, the processing system 130, 230 may determine location information for the plurality of RFID assemblies 212 in the environment based on an initial transmission from each of the RFID assemblies.

Figure 6:
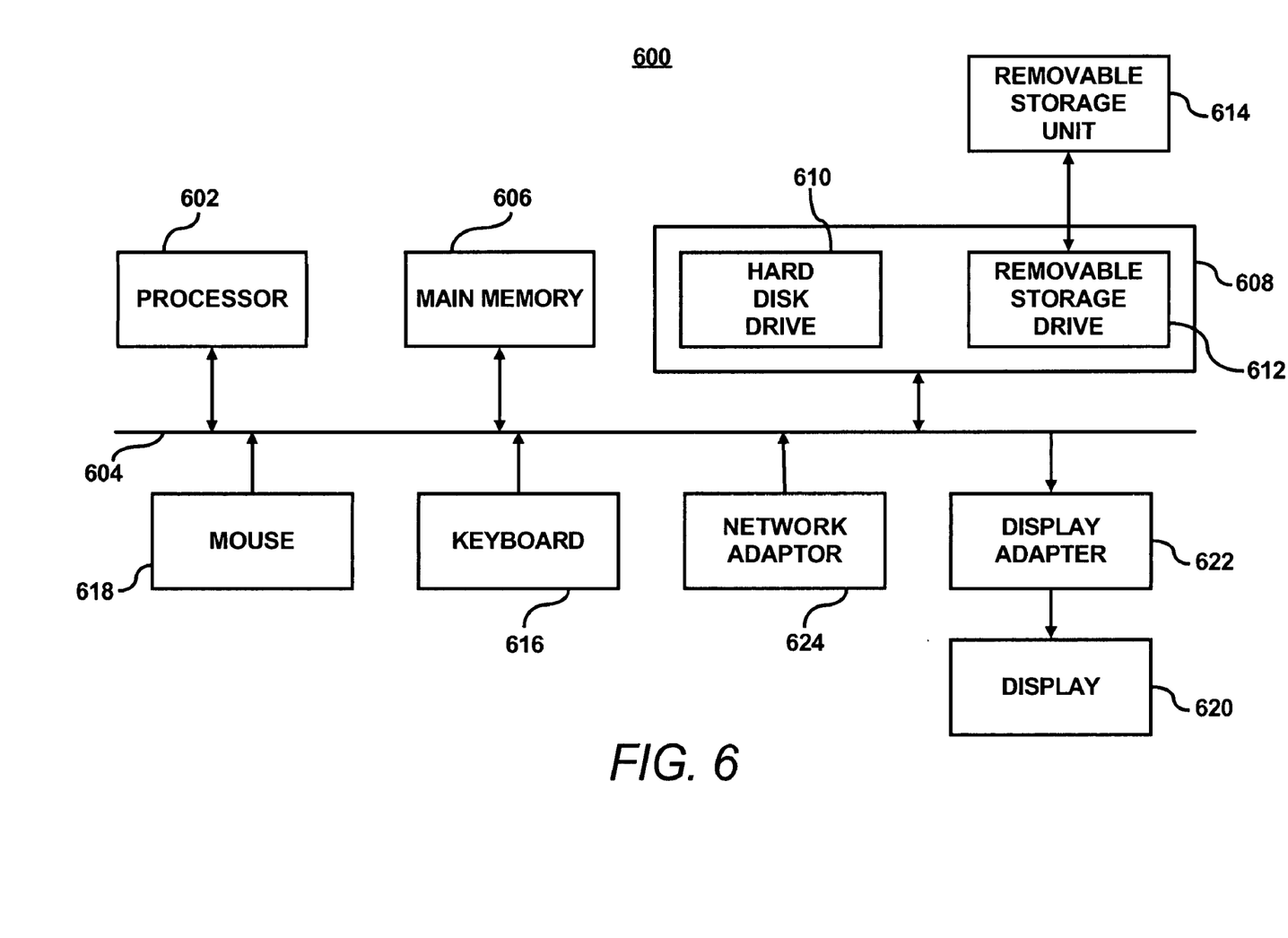
FIG. 6 is a block diagram illustrating a computer system operable to perform some or all of steps contained in the method depicted in FIG. 5.

FIG. 6 illustrates an embodiment of a computer system 600 operable to perform some or all of the steps contained in the method 500. In this respect, the computer system 600 may be used as a platform for executing one or more of the functions described hereinabove with respect to the various steps outlined in the method 500.

The term "computer-readable medium" as used herein refers to any medium that participates in providing instructions to the processor for execution. Such a medium may take many forms, including but not limited to non-volatile media, volatile media, and transmission media. Non-volatile media include dynamic memory, such as main memory. Transmission media include coaxial cables, copper wire and fiber optics, including the wires that comprise the bus. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

The computer system 600 includes one or more controllers, such as, a processor 602. The processor 602 may be used to execute some or all of the steps described in the method 500. Commands and data from the processor 602 are communicated over a communication bus 604. The computer system 600 also includes a main memory 606, such as a random access memory (RAM), where a program code may be executed during runtime, and a secondary memory 608. The secondary memory 608 includes, for example, one or more hard disk drives 610 and/or a removable storage drive 612, representing a floppy diskette drive, a magnetic tape drive, a compact disk drive, etc., where a copy of the program code for some or all of the steps contained in the method 500 may be stored.

The removable storage drive 612 reads from and/or writes to a removable storage unit 614 in a well-known manner. User input and output devices may include a keyboard 616, a mouse 618, and a display 620. A display adaptor 622 may interface with the communication bus 604 and the display 620 and may receive display data from the processor 602 and convert the display data into display commands for the display 620. In addition, the processor 602 may communicate over a network, for instance, the Internet, LAN, etc., through a network adaptor 624.

It will be apparent to one of ordinary skill in the art that other known electronic components may be added or substituted in the computer system 600. In addition, the computer system 600 may include a system board or blade used in a rack in a data center, a conventional "white box" server or computing device, etc. Also, one or more of the components in FIG. 6 may be optional (for instance, user input devices, secondary memory, etc.).

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A system for monitoring an environment, the system comprising:
    a plurality of RFID tags arranged in different layers of a multi-layered environment, wherein the plurality of RFID tags are configured to transmit information regarding the different layers; and
    a plurality of sensors associated with each of the plurality of RFID tags, wherein the plurality of sensors are configured to sense stress at each of the different layers caused by a physical event occurring in the environment around the assembly and convert the sensed stress at each of the different layers into power to at least partially power operation of the plurality of RFID tags to transmit information regarding the sensed stress at each of the different layers caused by the physical event.

2. The system of claim 1, wherein the plurality of RFID tags are configured to transmit information regarding the sensed stress caused by the physical event to a processing system.

3. The system of claim 2, further comprising:
    a first antenna configured to transmit at least some of the sensed information, and wherein the processing system comprises a second antenna configured to receive the sensed information.

4. The system of claim 1, further comprising:
    a battery to provide additional power to at least one of the plurality of RFID tags.

5. The assembly of claim 1, wherein the physical event includes at least one selected from an impact, a vibration, a biological change, a chemical change, and an optical change.

6. A method of monitoring an environment, the method comprising:
    sensing information regarding stress caused by a physical event in a multi-layered environment through a plurality of radio frequency identification ("RFID") assemblies, wherein the plurality of RFID assemblies are arranged in different layers of the multi-layer environment and, wherein the plurality of RFID assemblies are powered at least in part by power generated from the sensed stress caused by the physical event;
    transmitting the information regarding the physical event by the plurality of RFID assemblies in the different layers; and determining information regarding a physical change in the different layers of the multi-layered environment based on the sensed information from the different layers.

7. The method of claim 6, wherein determining information regarding the physical change in the different layers of the multi-layered environment comprises:
determining at least one of location of the physical change, type of the physical change, depth of the physical change, time the physical change occurred, evolution of the physical change and the rate at which the physical change is evolving based on the proximity of the plurality of RFID assemblies in the different layers to the physical event.

8. The method of claim 6, wherein determining information regarding the physical change in the environment comprises using an inverse algorithm to determine information regarding the physical change.

9. The method of claim 6, wherein sensing the information comprises sensing chemical information.

10. The method of claim 6, wherein sensing the information regarding the physical change in an environment comprises sensing information regarding physical change in at least one of a surface and a multi-dimensional space.

11. The method of claim 6, further comprising placing a continuous distribution of the plurality of RFID assemblies in the environment.

12. The method of claim 6, wherein the plurality of RFID assemblies comprises a RFID tag and at least one sensor, said method further comprising:
using at least one of the sensor or a transducer to transform power released during the physical event into power to power the RFID tag.

13. The method of claim 12, wherein transmitting information regarding the physical event further comprises:
transmitting the sensed information through the RFID tag to a processing system, wherein at least a portion of the determining step is performed at the processing system.

14. The method of claim 12, wherein using the sensor to transform power comprises using a piezoelectric element to transform power.

15. The method of claim 6, further comprising:
transmitting the sensed information and unique codes identifying the plurality of RFID assemblies to a processing system, wherein at least a portion of the determining step is performed at the processing system.

16. The method of claim 6, further comprising:
preprocessing information in tag electronics of the plurality of RFID assemblies.

17. The method of claim 6, further comprising:
determining location information for the plurality of RFID assemblies; and
determining information regarding the physical change in the different layers of the multi-layered environment based upon the location information.

18. The method of claim 6, further comprising:
continuously sensing information regarding the different layers of the multi-layered environment from the plurality of RFID assemblies to monitor the multi-layered environment.

19. The method of claim 6, further comprising providing power to the plurality of RFID assemblies using a battery.

20. The method of claim 6, further comprising providing power to the plurality of RFID assemblies using a RFID reader.

21. A system for monitoring an environment, the system comprising:
means for sensing information regarding a physical event in a multi-layered environment, wherein the means for sensing information regarding the physical event in the multi-layered environment is arranged in different layers of the multi-layered environment and powered at least in part by power generated from stress caused by the physical event;
means for transmitting the information regarding the physical event from the different layers; and
means for determining information regarding a physical change in the different layers of the multi-layered environment based on the sensed information.

22. The system of claim 21, wherein the determined information comprises at least one of location of the physical change, type of the physical change, depth of the physical change, time the physical change occurred, evolution of the physical change and the rate at which the physical change is evolving based on the proximity of the means for sensing information to the physical event.

23. A computer program on a computer readable medium and comprising code, that when executed, causes a computer to perform the following:
receiving information sensed by a plurality at RFID assemblies configured to sense a physical event occurring in a multi-layered environment, wherein the RFID assemblies are arranged in different layers of the multi-layered environment and powered at least in part by power generated from stress caused by the physical event; and
determining information regarding a physical change in the different layers of the multi-layered environment based on the received information.

* * * * *

UNITED STATES PATENT AND TRADEMARK OFFICE
CERTIFICATE OF CORRECTION

PATENT NO. : 7,397,370 B2  Page 1 of 1
APPLICATION NO. : 11/069389
DATED : July 8, 2008
INVENTOR(S) : Alexandre Bratkovski It is certified that error appears in the above-identified patent and that said Letters Patent is hereby corrected as shown below:

In column 10, line 61, in Claim 6, delete "multi-layer environment" and insert -- multi-layered environment --, therefor.

In column 11, line 10, in Claim 7, after "time" insert -- of --.

In column 12, line 34, in Claim 22, after "time" insert -- of --.

In column 12, line 41, in Claim 23, delete "at" and insert -- of --, therefor.

Signed and Sealed this

Fourteenth Day of July, 2009

JOHN DOLL
*Acting Director of the United States Patent and Trademark Office*